United States Patent [19]
Decap

[11] Patent Number: 5,324,097
[45] Date of Patent: * Jun. 28, 1994

[54] BOTTOM DUMP TRAILER

[76] Inventor: Camille Decap, Box 535, LaFleche, Saskatchewan, Canada, S0H 2K0

[*] Notice: The portion of the term of this patent subsequent to Jul. 21, 2009 has been disclaimed.

[21] Appl. No.: 871,817

[22] Filed: Apr. 21, 1992

[51] Int. Cl.⁵ ................................................ B60P 1/56
[52] U.S. Cl. ..................................... 298/35 M; 298/7
[58] Field of Search ............... 105/249, 251; 222/503, 222/506, 545, 547; 298/1 V, 7, 32, 33, 35 M, 37

[56] References Cited

U.S. PATENT DOCUMENTS

| 1,174,677 | 3/1916 | Campbell | 105/251 |
| 2,401,407 | 6/1946 | Benbow et al. | 105/249 |
| 3,966,255 | 6/1976 | Licari | 298/35 M |

FOREIGN PATENT DOCUMENTS 274709  10/1970  U.S.S.R. ............... 298/1 V

OTHER PUBLICATIONS

Photocopy of a photograph showing a machine manufactured by Midland Manufacturing Limited of Rosenort, Manitoba, Canada.

Primary Examiner—Michael S. Huppert
Assistant Examiner—Janice Krizek
Attorney, Agent, or Firm—Adrian D. Battison; Stanley G. Ade; Murray E. Thrift

[57] ABSTRACT

A conventional bottom dump truck includes doors which in a closed position are suspended underneath the bottom opening of the hopper of the trailer. The doors are opened outwardly and upwardly by pivotal action about an upper suspension point of each of the doors. The amount of movement of the door is limited by an abutment member mounted upon a vertical flange on the outside surface of the hopper bottom. The abutment member includes an abutment plate extending outwardly from the flange together with a bracket which has a slot slidable along the length of the flange and locatable at different points along the length of the flange by a pin passing through openings in the bracket and one of a plurality of openings in the flange. An elongate triangular body can be positioned between the doors during operation at minimum spacing so as to increase the angle of the surface of the doors beyond the angle of repose of the material to ensure complete discharge without hang up of the material on the doors.

19 Claims, 6 Drawing Sheets

BOTTOM DUMP TRAILER

BACKGROUND OF THE INVENTION

This invention relates to a bottom dump trailer and particularly to an arrangement for controlling the amount of movement of the doors of a bottom dump trailer for adjustment of the opening between the doors.

Bottom dump trailers are well known and widely used for transportation of gravel and other pourable solids. The trailer generally comprises a frame having ground wheels on the frame for transportation of the frame across the ground. A hopper is mounted on the frame with converging side walls which extend inwardly and downwardly to an open bottom of the hopper through which the pourable material can be dumped. Across the bottom on the outside is provided a pair of clam-shell type doors which pivot about respective axes which are parallel and arranged above the opening so that in a closed position the doors abutt at a central line of contact below the open bottom. A hydraulic cylinder is generally provided together with a control linkage which operates to move the doors simultaneously outwardly from the closed position so that the doors pivot outwardly and upwardly around the bottom edge of the hopper to define an opening between the doors through which the material can be dumped.

It is necessary in a device of this type to be able to adjust the size of the opening. Generally the hydraulic cylinder and linkage is arranged so that it simply moves the doors from the closed position to a wide open position at which the doors are halted either by the end of the stroke of the hydraulic system or by an engagement of the door with some part of the frame. It is however necessary in many cases to control this opening to a reduced width so that the dumping of the material takes place in a controlled manner to form a windrow as the trailer is moved forward.

One particular problem which arises with the adjustment of the opening for the discharge of the pourable material, particularly related to the pouring of gravel, arises when the opening is reduced to a small size. In this case it is difficult to control the size of the opening to a relatively small amount to allow proper control of the material as it flows outwardly from the hopper and in addition with the doors in the position of a very narrow opening, the angle of the surface of the doors is insufficient to cause the material to flow off the top of the doors so that the material does not properly clean out of the hopper.

SUMMARY OF THE INVENTION

It is one object of the present invention, therefore to provide an improved trailer of the bottom dump type in which the opening between the doors can be adjusted more readily and more effectively.

According to the invention, therefore, there is provided a bottom dump trailer comprising a trailer frame, ground wheels for transportation of the frame across the ground, a hopper mounted on the frame for transportation of a pourable solid material including hopper side walls converging downwardly and inwardly to an open bottom of the hopper for a discharge of the material through the open bottom, a pair of doors for opening and closing the open bottom each including a door surface and means mounting the door surface suspended from the frame so as to be pivotal about a respective axis of movement offset from the door surface to one side thereof, said respective axis being parallel and arranged above said open bottom, the doors thus being pivotally movable each about said respective axis from a first closed position, in which the door surfaces lie across an underside of the open bottom to hold the material against discharge from the hopper, to a second open position in which an opening is formed between the door surfaces to allow discharge of said material, drive means for moving both doors outwardly from the first closed position toward a respective one of two opposed sides of the hopper, and control means for controlling discharge of material from the opening between said doors in the second open position thereof, said control means comprising an elongate body and means mounting the body between the doors longitudinally of the respective axis, the elongate body having two control surfaces each extending longitudinally of the doors and each cooperating with a respective one of the doors such that a front edge of each door can close against a respective one of the surfaces, the surfaces converging upwardly and inwardly to an apex extending longitudinally of the doors between the doors, said mounting means holding said elongate body such that each door when moved from the first closed position thereof moves away from the respective surface of the body to define a discharge opening between the door and the respective surface such that the material resting on the body can slide from the apex downwardly and outwardly along the surfaces for discharge through the respective discharge opening.

The abutment members are therefore located at a position on the side of the hopper which is readily accessible to the operator. In most cases the operator can simply walk to the side of the hopper and adjust the position of the abutment member. In the preferred embodiment described hereinafter, the abutment member can simply slide along a flange and can be located at the required position by passing a pin through the abutment member and through the flange. There is no necessity for the operator to crawl under the device or to guess the location and length of a chain.

One or more embodiments of the invention will now be described in conjunction with the accompanying drawings,

DETAILED DESCRIPTION

Figure 1:
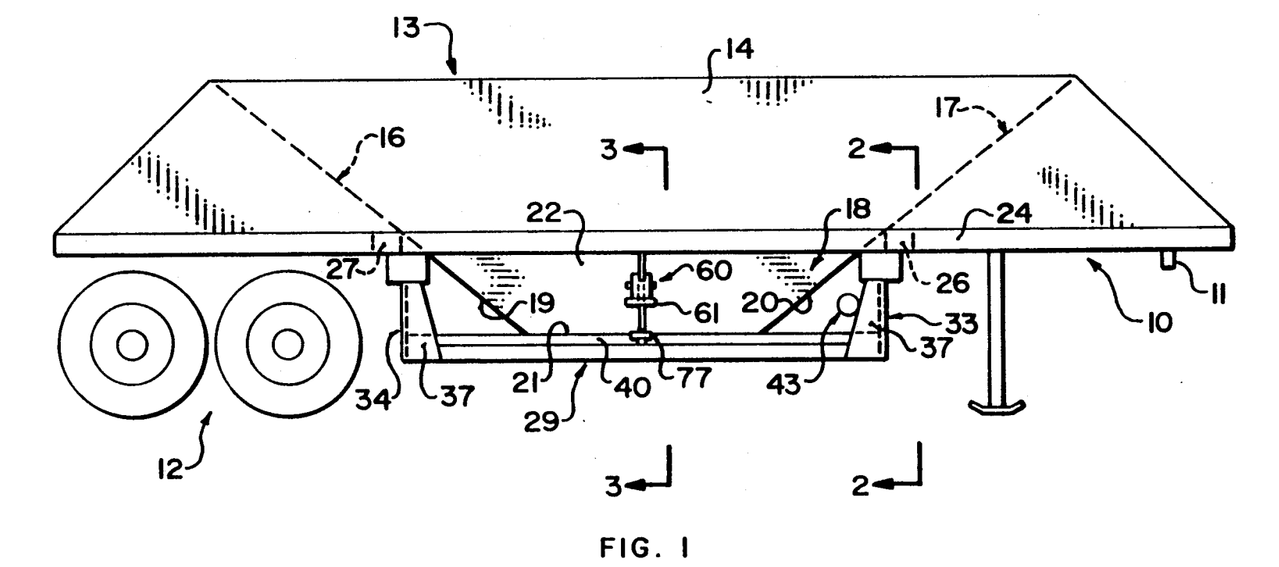
FIG. 1 is a side elevational view of a trailer according to the present invention.

A trailer is shown in FIG. 1 and comprises a main frame schematically indicated at 10 having a kingpin 11 at a forward end for attachment to a tractor vehicle and ground wheels 12 at a rearward end for transportation of the trailer across the ground. The main frame 10 carries a hopper generally indicated at 13 with side walls 14 and 15 and end walls 16 and 17. The end walls converge inwardly toward a central section to allow discharge of a pourable solid material to be transported within the hopper.

A hopper bottom section is generally indicated at 18 and includes end walls 19 and 20 acting as continuations of the end walls 16 and 17 so that they converge inwardly toward an open bottom 21 through which the material is to be discharged. The hopper bottom further includes side walls 22 and 23 which also converge inwardly toward the rectangular bottom opening 21 which lies in a horizontal plane and is bounded by the lowermost edges of each of the converging hopper bottom walls 19, 20, 22 and 23.

The main frame 10 includes a pair of longitudinal main beams 24 and 25 which extend along the full length of the trailer together with a plurality of cross beams one of which is shown at 26 and is positioned just forward of the hopper bottom and a similar cross beam 27 is positioned just rearward of the hopper bottom. Further frame beams can also be provided to give the necessary structural strength but are not shown for convenience of illustration.

Figure 3:
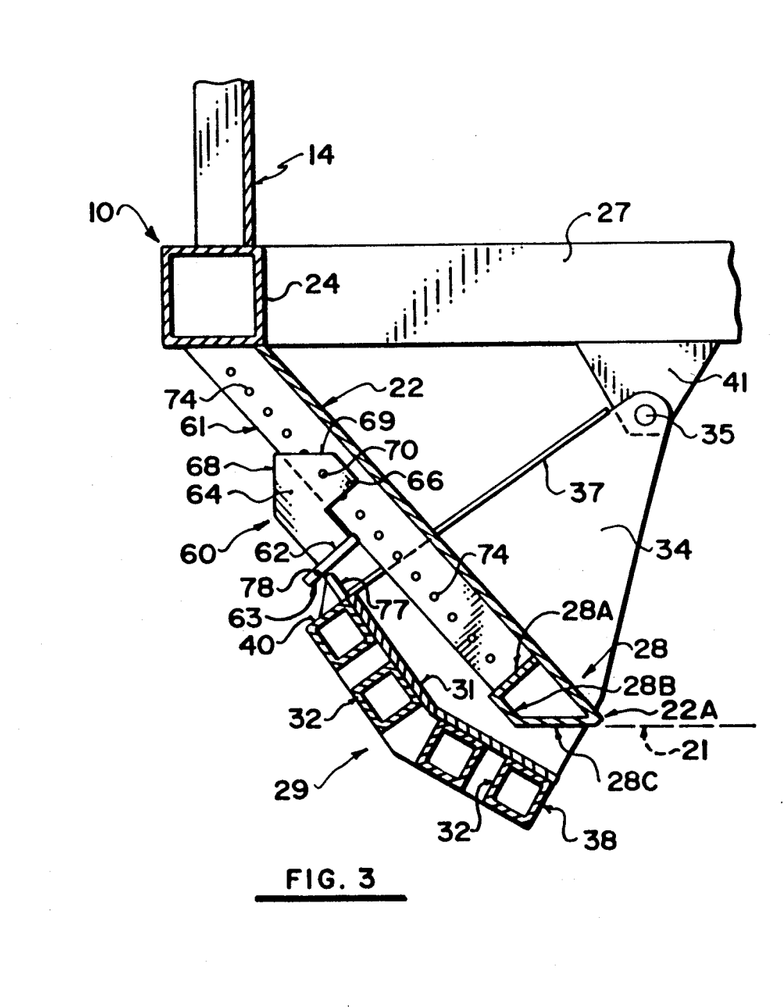
FIG. 3 is a view along the line 3—3 of FIG. 1 showing one half only of the bottom of the hopper for convenience of illustration.
Figure 4:
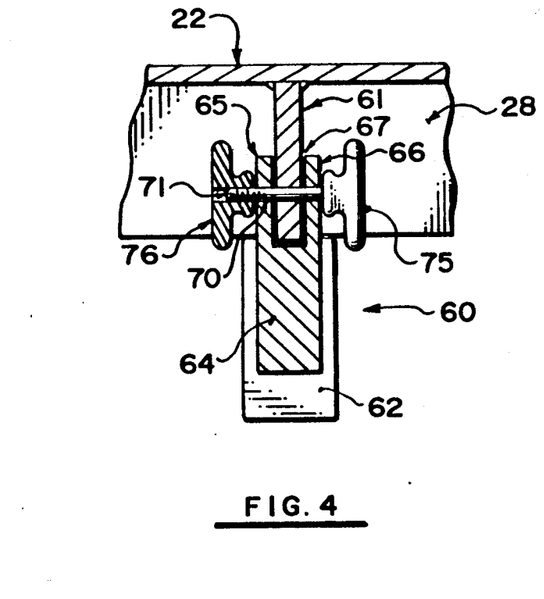
FIG. 4 is a cross-sectional view along the line 4—4 of FIG. 2.

As best shown in FIG. 3, the main longitudinal beam 24 projects outwardly from the side wall 14 of the hopper and also projects outwardly from the hopper bottom side wall 22. In addition to provide structural strength for the lowermost edge of the hopper bottom walls, a beam is provided at that lowermost edge and is defined by a fabricated channel which is attached to the outer surface of the side wall at the lowermost edge indicated at 22A. The channel includes a flange 26 projecting outwardly from the side wall, a web 27 parallel to the side wall 22 and a lowermost horizontal flange 28 extending from the lowermost edge of the web 27 to an apex at the lowermost edge 22A of the side wall 22.

Figure 2:
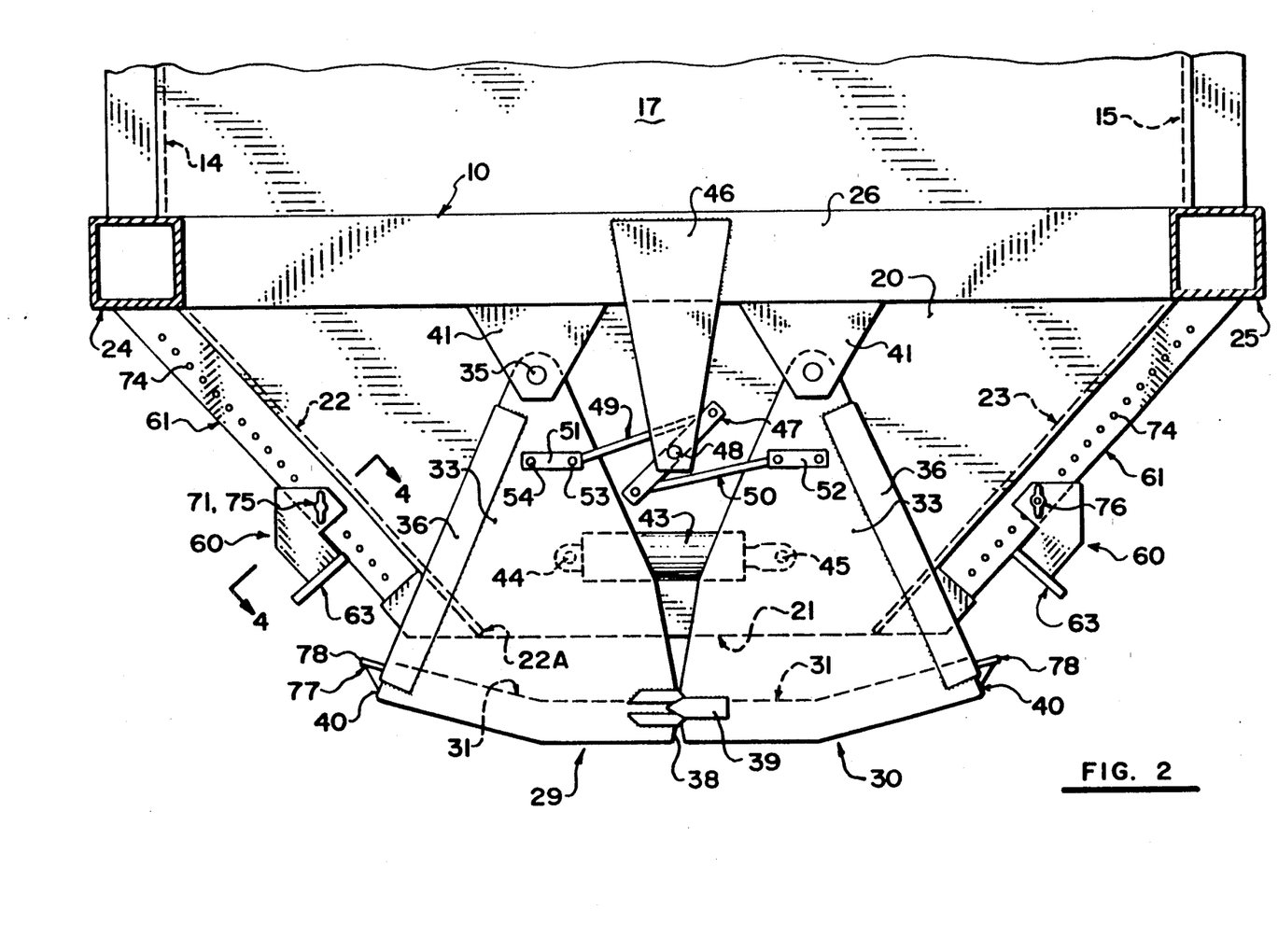
FIG. 2 is a view along the line 2—2 of FIG. 1.

In order to maintain the pourable solid material within the hopper when under transportation, a pair of doors is provided as indicated at 29 and 30 which cooperate generally in a clam shell manner. Each of the doors comprises a door surface 31 onto which the material will fall to be supported by the door surface against further vertically downward movement. As shown in FIG. 3 the door surface is formed from a metal sheet which is supported by longitudinal beams 32. The longitudinal beams are attached to triangular end plates 33 and 34 which extend upwardly from the door surface to a pivot axle 35 positioned on the upper side of the door surface and generally symmetrically above the door surface to allow a pivotal action of the door surface about an axis offset from the door surface and arranged above the door surface as best shown in FIG. 2. The triangular end plates 33 and 34 are supported by stiffening ribs 36 and by side plates 37 to cradle the ends of the beams 32 and to provide a sufficiently rigid and strong frame to support the door surface 31 and the weight of the material carried thereby during the transportation mode.

As shown in FIG. 2, the doors each include a front edge 38 which in the closed position abut at a line of contact substantially symetrically positioned centrally of the hopper bottom and longitudinally of the hopper bottom. A suitable strengthening guide element is provided at the line of contact to assist in preventing twisting of one door relative to the other in the closed position of the door against the relatively large forces provided by the material on the door surface. Each of the doors further includes an outermost edge 40 which of course is positioned outwardly of the edge 22A in the closed position shown in FIG. 2 so as to prevent the escape of material outwardly over the outer edge of the door. The position of the door relative to the edge 20A is arranged such that the repose angle of the material acts to keep the material restrained within the hopper bottom and above the door surfaces.

The axle 35 of each door is mounted upon a triangular support 41 carried on the main transverse beam 26 and depending therefrom. The axle is thus located above the opening 21 with each axle spaced equidistantly outwardly from the central line of contact but inwardly of the edge 20A.

Movement of the doors from the closed position shown in FIG. 2 is obtained by operation of a hydraulic cylinder 43 located in the space between the front wall 20 of the hopper bottom and the end plate 33 of the doors. The hydraulic cylinder 43 includes end couplings 44 and 45 connected respectively to the doors 29 and 30 so that expansion of the hydraulic cylinder causes the doors to move apart to an open position.

A control linkage is provided to ensure symetrical movement of the doors as the doors are opened so that each door moves from a closed position towards an open position by an equal amount. The control linkage is supported from a bracket 46 positioned on a centre line of the trailer and depending downwardly between the two supports 41. The bracket carries a first lever 47 which is pivotal about an axle 48 carried at a lower end of the bracket 46. The lever extends outwardly from each side of the axle 48 to define an upper and a lower part with the upper part connected to the door 29 by a rod 49 and a lower part connected to the door 30 by a rod 50. Each of the rods connects to a link 51 and 52 respectively. The link 51 is pivotally coupled to the rod 49 at a pivot axis 53 and is pivotally connected to the door 29 at a pivot axis 54. The amount of movement of the link is limited. As the doors are thus moved apart, the cooperation between the control rods 49 and 50 and the central lever 47 ensures that the doors move symmetrically.

The amount of movement of each of the doors is controlled by an abutment member generally indicated at 60. Each of the doors 29 and 30 has a respective one of a pair of the abutment members 60. The abutment member 60 can be adjusted in position inwardly and outwardly to limit the amount of movement of the doors to a required position so as to adjust to a required dimension the opening between the doors through which the material is deposited.

Each of the abutment members 60 is mounted upon a flange 61 which lies in a vertical plane and extends as best shown in FIG. 3 from the main beam 24 to the lower support beam generally indicated at 26A. The flange thus is welded to the side wall 22 at spaced positions along the length of the flange and acts therefore as a support flange for the wall 22. The flange is welded at its upper end to the beam 24 and its lower end to the flange 26 of the lower beam 26A. The flange 61 projects out to a distance approximately equal to the width of the flange 26.

The abutment member 60 includes an abutment plate 62 which is supported so that it extends outwardly from the flange 61 generally at right angles thereto and defines a lower surface 63 providing an abutment surface for engaging the outer edge of the door in the open position. The abutment plate 62 is supported in position by a support bracket 64 mounted upon the flange 61. The bracket 64 includes a pair of projecting portions 65 and 66 which extend toward the flange 61 and define a slot 67 therebetween for receiving the flange 61 in a sliding action between the projecting portions. The projecting portions extend partway across the width of the flange and over a length sufficient to hold the bracket in place on the flange without twisting. From a projecting portion 65 and 66, the bracket extends outwardly from the flange and slightly longitudinally of the flange from the projecting portions to be connected to the abutment plate 62 at a position spaced downwardly from the projecting portions. The edges 68 and 69 of the bracket are chamfered to provide a pleasing appearance of the element defining the bracket. The bracket has an opening 70 therethrough passing through the projecting portion 65 and 66 to receive a pin 71 in a locking action of the bracket on the flange. The flange thus includes a plurality of such openings 74 at spaced positions along the length of the flange and at a position spaced from the edge of the flange sufficient that the base of the slot in the bracket lies along the outermost edge of the flange when the pin 71 is located through the openings. The pin includes a T-bar handle 75 at one end and a nut 76 at the other end which can be threadidly engaged with a screw thread on the pin to clamp the nut and T-shaped handle against sides of the projecting portions to hold the bracket securely in place on the flange at the required location.

The outer edge 40 of the door carries a projecting plate 77 which has an outer abutment surface 78 for engaging against the surface 63 of the abutment plate 62 in the abuting action shown in FIG. 3. The edge of the plate 78 provides the abuting action against the surface 63 so that the width of the edge 78 is significantly less than the width of the plate 63. This provides a constant and effective abuting action despite the fact that the position of abutment moves longitudinally of the plate 62 as the bracket is moved longitudinally of the flange 61.

In operation, the operator of the vehicle can readily adjust the amount of movement of the door on each side of the vehicle from the closed position to a required open position. The required spacing between the doors in the open position will vary depending upon the particular usage of the vehicle and the material being transported. The adjustment in the device described can be effected with the doors in the closed position simply by the operator removing the pin 71 from the opening in the bracket and sliding the bracket upwardly or downwardly along the flange 61 to the required location. The pin is then replaced in the opening 70 to hold the bracket in position. A single pin is sufficient in view of the effective holding action of the bracket on the flange provided by the slot and the engagement of the base of the slot with the outer edge of the flange. The adjustment can be effected simply by the operator standing adjacent the side of the vehicle without the necessity to crawl under the vehicle or to reach to parts of the vehicle which may have become dirtied by engagement with the material. The operation is therefore clean and efficient.

Figure 5:
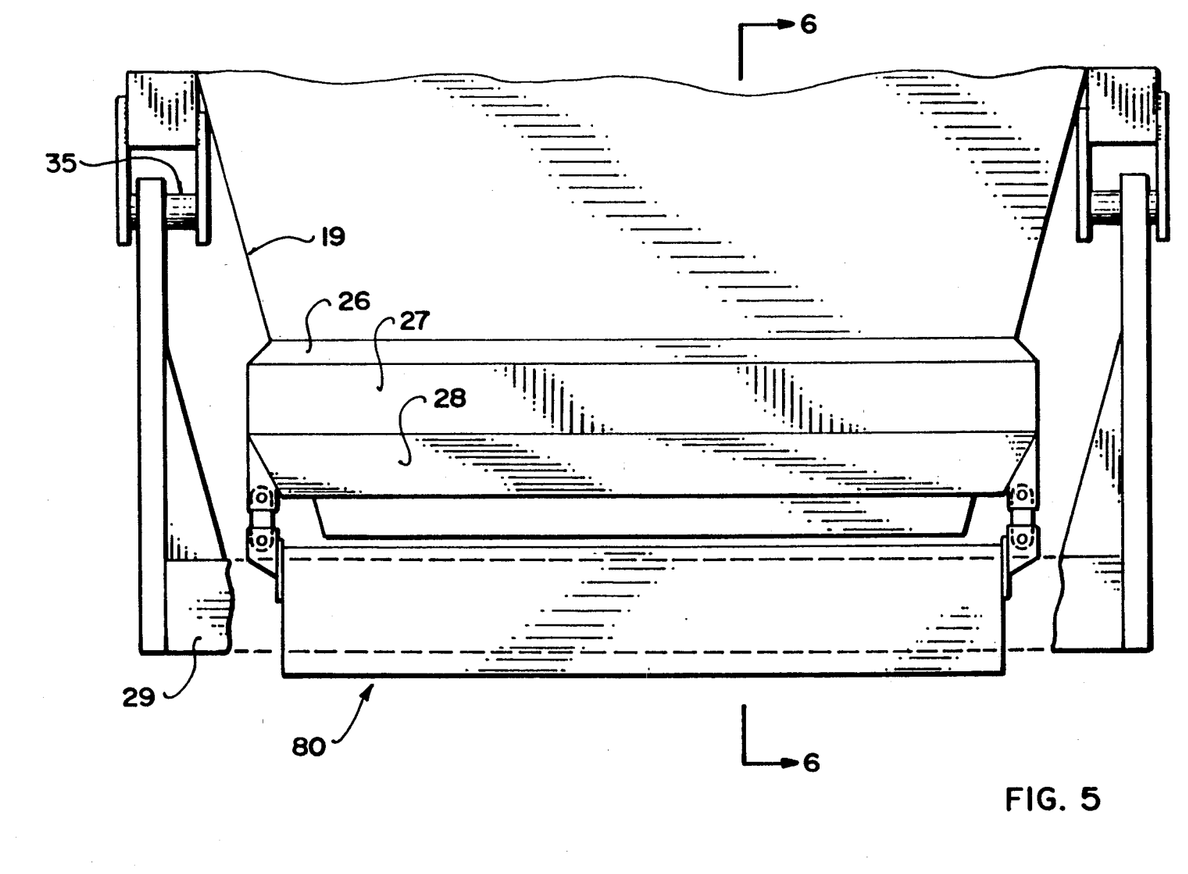
FIG. 5 is a side elevational view similar to that of FIG. 1 showing only the area of the bottom of the hopper and including an additional element for assisting in discharge of the materials with narrow opening of the doors.
Figure 6:
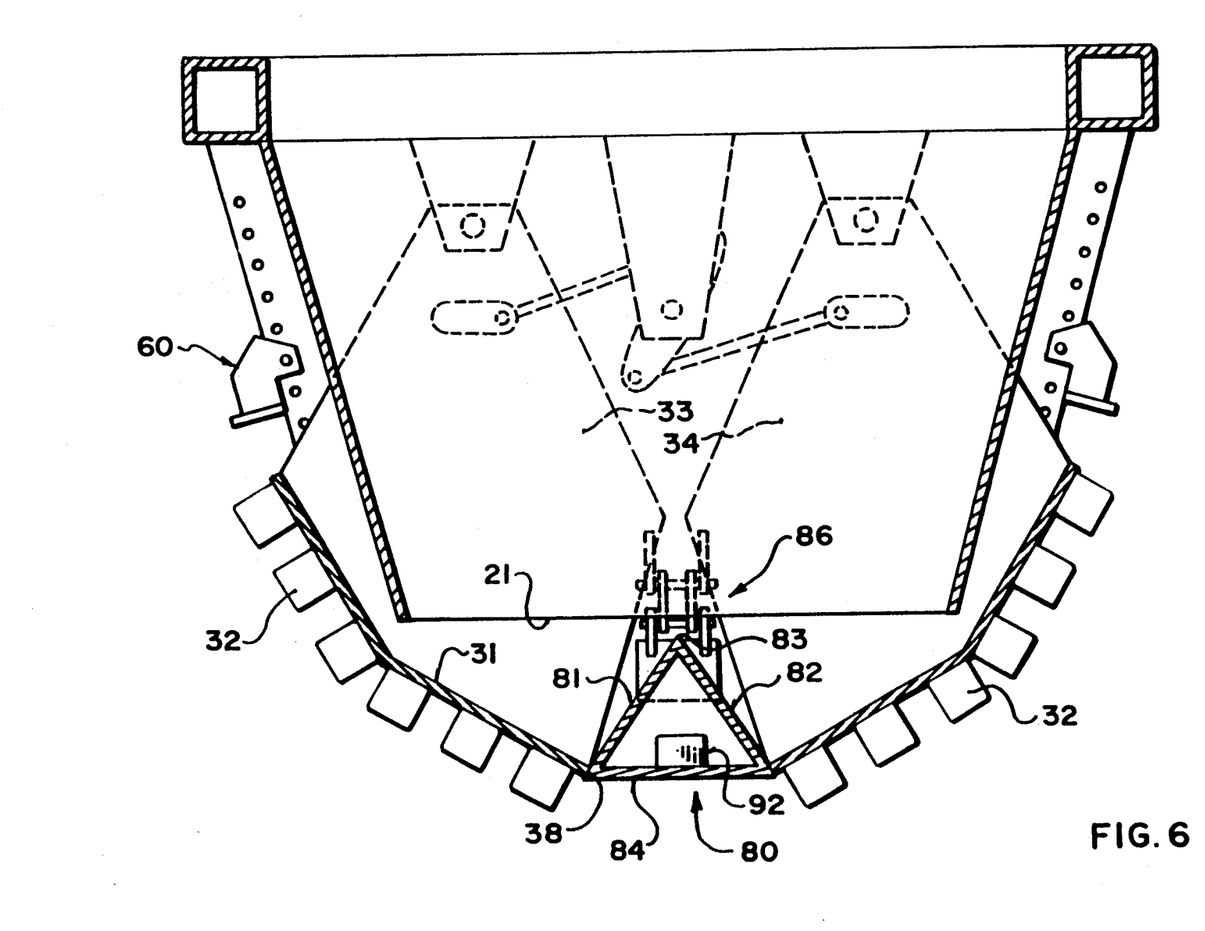
FIG. 6 is across sectional view along the line 6—6 of FIG. 5.
Figure 7:
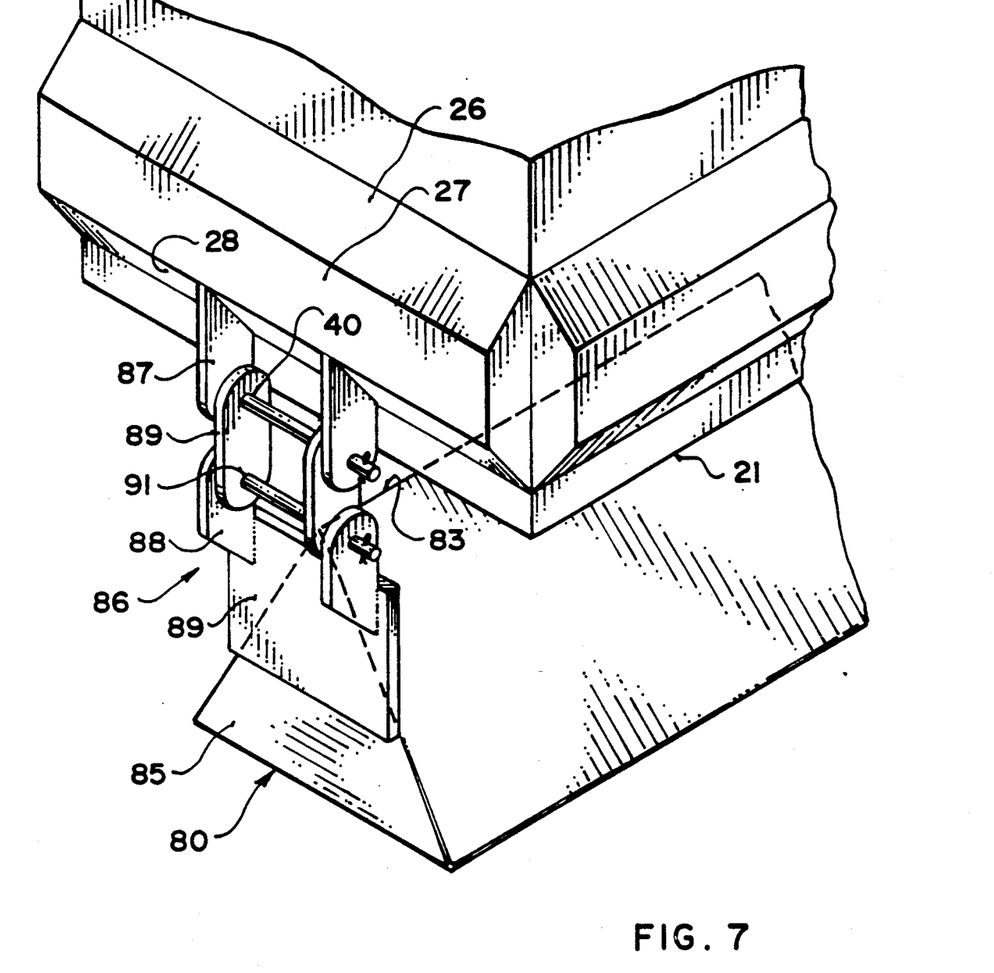
FIG. 7 is an isometric view of the lower part of the hopper showing the additional element with the doors omitted for convenience of illustration, In the drawings like characters of reference indicate corresponding parts in the different figures.

In FIGS. 5, 6 and 7 is shown a modified arrangement in which the hopper 19, doors 29 and abutment member 60 are as previously described. In this arrangement an additional control body generally indicated at 80 is provided which is intended to operate in a mode in which the doors are at a very narrow opening setting for a relatively small amount of discharge of the materials through the central opening. The control body 80 comprises a member which is triangular in cross section including two control surfaces 81 and 82 which converge upwardly and inwardly to an uppermost apex 83. The body further includes a horizontal base wall 84 thus forming a closed triangular body of constant cross section. The body includes end plates 85. The surfaces 81 and 82 are planar and the apex 83 forms a straight line extending along the hopper at a position beneath the lowermost edge 21 of the hopper, The elongate triangular body 80 extends from a position just beyond the end wall of the open mouth of the hopper at one end of the hopper to a position just beyond the opposed end of the open mouth of the hopper, In this way along the full length of the open mouth of the hopper the material is exposed to the apex 83 and to the two control surfaces 81 and 82 so it is free to fall upon those surfaces, The elongate body extends along the full length of the open mouth of the hopper without support along that length but is instead supported at its ends by a hinge coupling mechanism generally indicated at 86, This coupling comprises an upper link 87 welded onto the inclined lower flange 28 of the stiffening beam of the hopper, The coupling further includes a lower link 88 welded to a square plate 89 which depends vertically downwardly at the end of the elongate body and is welded to the end plate 85 thereof, Between the links 87 and 88 is provided a coupling link 89 pivotally connected to the link 87 by a pivot shaft 90 and pivotally connected to the lower link 88 by a pivot shaft 91. To provide sufficient strength and to provide transverse stiffness, there are provided two such links each arranged at a respective end of the square plate 89. This double link arrangement allows swinging movement of the elongate body in a longitudinal direction but prevents twisting movement side to side.

Inside the hollow elongate body is provided a vibrator generally indicated at 92 which generates vibrational movement of the elongate body generally in the longitudinal direction. This longitudinal movement is obtained by the pivotal movement of the links and thus acts slightly also to lift and lower the elongate body relative to the mouth of the hopper and relative to the doors. This reduces bridging and assists in discharging the material from the hopper.

As best shown in FIG. 6, the door surface 31 in the closed position moves into contact with a respective one of the control surfaces 81 and 82 and pinches thereagainst to provide a closing action to hold the material tending to fall from the mouth of the hopper upwardly on the upper surface 31 of the door and on the surfaces 81 and 82 of the elongate body.

When it is desired to release the material from the hopper, the doors are moved outwardly as previously described into engagement with the abutment member 60. With use of this device the abutment members are adjusted so that only a relatively small opening is defined between the edge 38 of the door and the adjacent line of contact with the respective surface 81, 82. This opening is arranged to be just sufficient to allow the material to exit at a required relatively low rate. During the discharge the material thus rests upon the upper surface 31 of the door and upon the associated control surface 81, 82 and slides down those surfaces through the narrow opening between the edge 38 in the line of contact. Because both of the surfaces are inclined at an angle which is greater than the angle of repose of the material, the material will generally slide to the discharge opening without the danger of hanging up or bridging upon the surfaces.

It will be appreciated that the addition of the elongate body between the two doors significantly increases the angle of the doors during the discharge with a relatively narrow opening. Thus the angle of the surfaces 31 of the doors is significantly increased over and beyond what it would be if the elongate body were omitted for a predetermined width of opening. This increase in angle is sufficient to move the surfaces from a position in which the material can collect thus preventing complete discharge to a position in which the angle is greater than the angle of repose and therefore the material fully discharges.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A bottom dump trailer comprising a trailer frame, ground wheels for transportation of the frame across the ground, a hopper mounted on the frame for transportation of a pourable solid material including hopper side walls converging downwardly and inwardly to an open bottom of the hopper for a discharge of the material through the open bottom, a pair of doors for opening and closing the open bottom each including a door surface and means mounting the door surface suspended from the frame so as to be pivotal about a respective axis of movement offset from the door surface to one side thereof, the respective axes of the doors being mutually parallel and arranged above said open bottom, the doors thus being pivotally movable each about said respective axis from a first closed position, in which the door surfaces lie across an underside of the open bottom to hold the material against discharge from the hopper, to a second open position in which an opening is formed between the door surfaces to allow discharge of said material, drive means for moving both doors outwardly from the first closed position toward a respective one of two opposed sides of the hopper, and control means for controlling discharge of material from the opening between said doors in the second open position thereof, said control means comprising an elongate body and means mounting the body between the doors longitudinally of the respective axes the elongate body having two control surfaces each extending longitudinally of the doors and each cooperating with a respective one of the doors such that a front edge of each door can close against a respective one of the control surfaces, the control surfaces converging upwardly and inwardly of the open bottom to an apex extending longitudinally of the doors between the doors, said mounting means holding said elongate body such that each door when moved from the first closed position thereof moves away from the respective control surface of the body to define discharge opening between the door and the respective control surface such that the material resting on the body can slide from the apex downwardly and outwardly along the control surfaces for discharge through the respective discharge opening.

2. The trailer according to claim 1 wherein the elongate body is substantially triangular in cross section.

3. The trailer according to claim 1 wherein the body extends from one end of the open bottom to an opposed end of the open bottom and is of substantially constant cross section along the length thereof.

4. The trailer according to claim 1 wherein the body includes a base wall interconnecting said control surfaces thereof across an underside of the control surfaces to form a substantially closed hollow body.

5. The trailer according to claim 1 wherein the body is suspended from the hopper at opposed ends of the hopper.

6. The trailer according to claim 1 wherein the mounting means is arranged to provide flexible suspension for the body allowing movement thereof relative to the hopper and to the doors.

7. The trailer according to claim 6 wherein the mounting means comprises a first double hinge arrangement at one end of the hopper and a second double hinge arrangement at an opposed end of the hopper, each double hinge arrangement having a first portion thereof attached to the hopper and a second portion thereof attached to the body and each allowing longitudinal movement of the first portion relative to the second portion about axis transverse to the length of the body so as to allow suspension movement of the body in the direction longitudinal of the body.

8. The trailer according to claim 7 including a vibrator mounted on the body so as to cause said longitudinal movement to assist in causing discharge of the material through the respective discharge openings.

9. The trailer according to claim 1 wherein the width of the body at lines of contact thereof with the front edges of the doors is sufficient to hold the doors at an angle of the door surface thereof which causes the material to flow across the door surface to the respective discharge opening.

10. The trailer according to claim 1 including means for halting movement of the doors at a required predetermined size of the respective discharge openings, said halting means comprising a first and a second abutment member, first mounting means mounting said first abutment member on a first frame member adjacent a respective one of said opposed sides of the hopper, second mounting means mounting said second abutment member on a second frame member adjacent the other of said opposed sides of the hopper, each of said doors having means thereon for engaging a respective one of said first and second abutment members, each of said mounting means including means defining a plurality of selectable locations for the respective abutment member such that the amount of movement of the respective door from the first position can be adjusted for adjustment of the size of the respective discharge opening.

11. A bottom dump trailer comprising a trailer frame, ground wheels for transportation of the frame across the ground, a hopper mounted on the frame for transportation of a pourable solid material including hopper sidewalls converging downwardly and inwardly to an open bottom of the hopper for discharge of the material through the open bottom, a door for opening and closing the open bottom including a door surface and means mounting the door surface suspended from the frame so as to be pivotal about an axis of movement offset from the door surface to one side thereof and arranged above said open bottom, the door thus being pivotally movable from a first position, in which the door surface lies across an underside of the open bottom with a front edge of the door surface in contact with a closure member at a line of contact which is below the open bottom to a second position in which an opening is formed between said front edge and said closure member, drive means for moving said door outwardly from the first position toward one of two opposed sides of the hopper, and means for halting said movement at a required predetermined size of the opening between said front edge and said closure member, said halting means comprising an abutment member, mounting means mounting said abutment member on a frame member adjacent said one of said two opposed sides of the hopper, said door having means thereon for engaging said abutment member, said mounting means including means defining a plurality of selectable locations for the abutment member such that the amount of movement of the door from the first position can be adjusted for adjustment of the size of the opening.

12. A trailer according to claim 11 wherein the abutment member comprises a surface lying in a plane projecting outwardly from a side of the hopper and wherein the door includes a member mounted on an edge of the door remote from the front edge and arranged for engagement with the surface, the surface and the member being arranged to provide contact therebetween with the position of the contact varying in dependance upon the location selected from said plurality of locations.

13. A trailer according to claim 12 wherein said member on the door includes an abutment edge which has a width which is comparatively narrow relative to a width of said surface in a direction projecting outwardly from the side of the hopper.

14. A trailer according to claim 11 wherein said mounting means includes a pin and wherein said abutment member includes an opening therein for receiving the pin and wherein said means defining a plurality of selectable locations comprises an elongate member extending in a substantially vertical plane along a respective side wall of the hopper, the elongate member having a plurality of openings therein each for receiving the pin such that the pin can locate the abutment member at a respective one of the openings in the elongate member.

15. A trailer according to claim 14 wherein the elongate member comprises a flange lying in a vertical plane and extending outwardly from the side wall of the hopper.

16. A trailer according to claim 15 wherein the flange is attached to the side wall along a side edge of the flange and wherein a top end of the flange is attached to an upper horizontal frame member of the hopper and the bottom edge of the flange is attached to a lower horizontal frame member of the hopper.

17. A trailer according to claim 16 wherein the flange is inclined so that it extends outwardly and upwardly from the lower horizontal frame member to the upper horizontal frame member.

18. A trailer according to claim 15 wherein the abutment member includes a slot therein such that portions of the abutment member straddle the flange with the flange lying in the slot, the abutment member opening extending through the portions for receiving the pin passing through the portions and through the flange.

19. A trailer according to claim 18 wherein the abutment member surface provided on a plate welded on an underside of the portions and projecting outwardly from the flange.

* * * * *